July 11, 1944.　　　　S. PERRY　　　　2,353,498
VALVE OPERATED MOTOR CONTROLLING SWITCH
Filed Jan. 18, 1941

Inventor
Stanley Perry
by Parker & Carter
Attorneys.

Patented July 11, 1944

2,353,498

UNITED STATES PATENT OFFICE 2,353,498

VALVE OPERATED MOTOR CONTROLLING SWITCH

Stanley Perry, Chicago, Ill., assignor to Oil Devices, Santa Fe, N. Mex., a limited partnership of Illinois Application January 18, 1941, Serial No. 375,081

2 Claims. (Cl. 236—1)

My invention relates to an improvement in control devices for liquid fuel valves.

One purpose is the provision of a control device effective to control a plurality of motors employed in connection with a heater. For example, I may control a blower motor for circulating room air through or about the heater, and a booster motor for directly controlling the air supply to the heater or to the burner. The booster motor may, for example, be incorporated in the heater.

Another purpose is the provision of a multiple thermostatic control in which I may, for example, have one thermostat responsive to temperature conditions within a house or space to be heated, and another thermostat responsive to temperature conditions outside of the house or space to be heated.

An advantage of the use of the outside thermostat is that with moderate outside temperature conditions the outside thermostat will remain in open circuit position, and therefore the burner will be restricted to operation at an intermediate stage, providing longer operating periods and better comfort conditions in the house than would be obtained by using the maximum combustion stage for shorter periods.

Another purpose is the provision of motor control means coordinated with valve control means.

Other purposes will appear from time to time in the course of the specification and claims.

I illustrate my invention more or less diagrammatically in the accompanying drawing wherein.

Like parts are indicated by like symbols throughout the specification and drawing.

Figure 1:
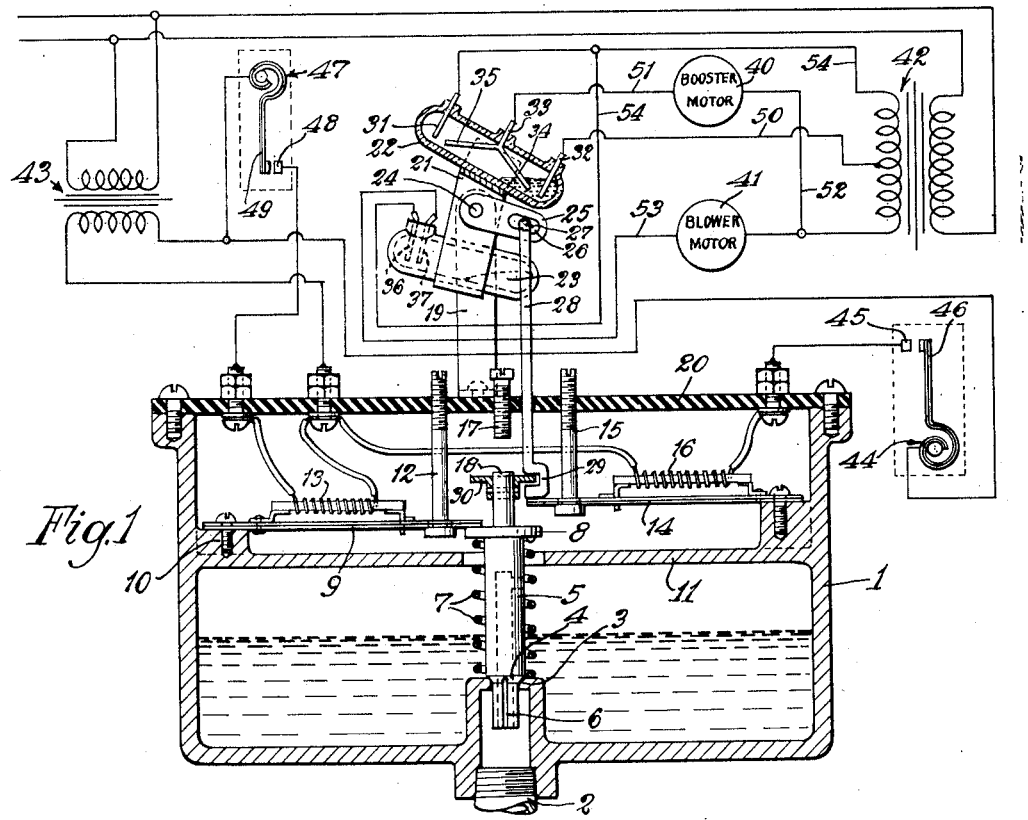
Fig. 1 is a vertical section through a valve housing and has further incorporated in it a diagrammatic showing of the circuits involved.

Referring to the drawing, I generally indicates a valve housing, float chamber, or the like. Any suitable means not herein shown may be employed for delivering a liquid fuel thereto. 2 indicates a fuel delivery passage extending from the housing I. 3 is any suitable valve seat adapted to be controlled by any suitable valve 4 in the lower end of the valve stem 5 and provided for example with any suitable metering slots 6. 7 is a spring or suitable yielding means adapted normally to urge the valve and valve stem toward open position. 8 is any suitable abutment for the upper end of the spring 7, which in the form herein shown may, incidentally, also serve as a limit means adapted to be engaged by an initial warping bar 9, mounted as at 10 upon or above any suitable partition 11. It will be understood that the partition 11 is optional.

Figure 2:
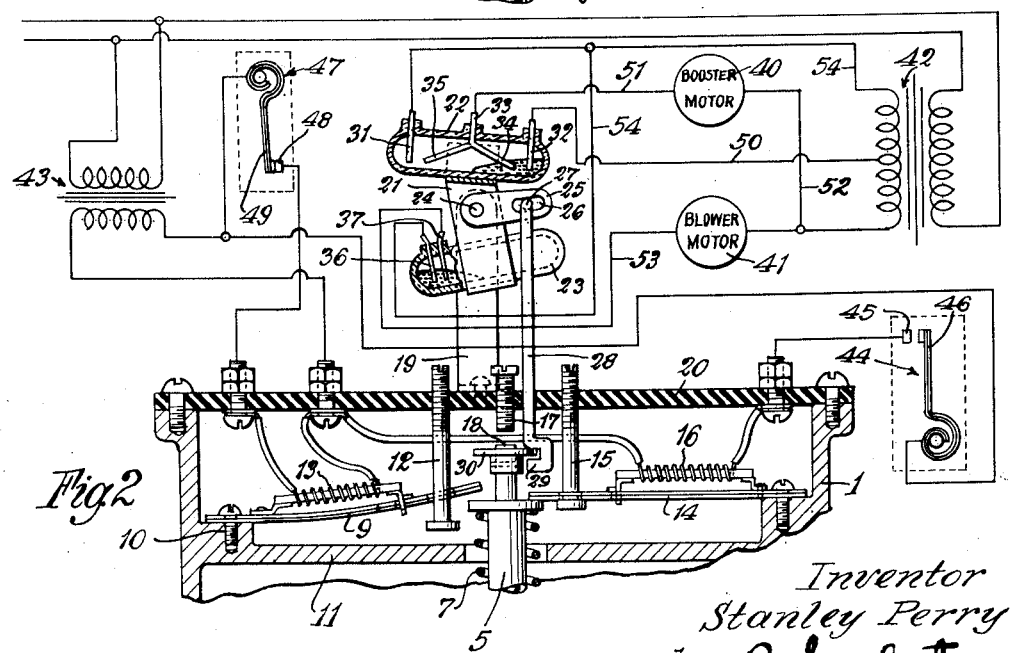
Fig. 2 is a similar section illustrating the parts in a different position.

The downward flexure of the warping bar 9 when cold may be limited by any suitable adjustable stop 12. It will be understood that when cold the end of the warping bar 9 engages and limits the upward movement of the valve stem 5 in response to the compression of the spring 7. 13 is any suitable resistance for the warping bar 9. When the resistance 13 is heated, the warping bar 9 warps up to the position in which it is shown in Fig. 2, and the abutment 8 of the valve stem 5 is then initially engaged by a second warping bar 14, the position of which may be controlled as by the adjustable stop or limit means 15. The second warping bar 14 is provided with the resistance 16. When the second resistance 16 is heated, the second warping bar 14 may then warp upwardly and permit the valve stem a further rise, which may finally be limited by the adjustable stop 17, which may engage an upward extension or upper portion 18 of the valve stem 5.

Mounted on a bracket 19, which may for example be positioned on or above the cover 20 of the chamber I, is a tilting arm 21, an upper portion of which carries the mercury switch element 22, and the lower portion of which carries the mercury switch element 23. The arm 21 is pivoted as at 24 and is provided with an actuating lever, 25, slotted as at 26 to receive any suitable pin or lateral extension 27 of the control rod 28, which extends downwardly through the cover 20 and is provided with a hook or engaging portion 29, which engages with the abutment 30 upon the upward extension 18 of the valve stem. Thus, vertical movement of the valve stem is effective to tilt the arm 21 about its pivot 24 and is effective thereby to actuate the mercury switches 22 and 23. It will be observed that the mercury switches are inclined somewhat in relation to each other. The upper switch 22 has end contacts 31, 32 at opposite ends thereof, and a central contact 33 having lateral extensions 34 and 35. The lower switch 23 has two contacts 36, 37 at one end thereof. As will be seen, for example in Fig. 1, when the valve stem is in the lower position, the contacts 36 and 37 are out of contact with the mercury, and the circuit through the switch 23 is, therefore, broken. At that time, however, a circuit is closed between the contacts 32 and 33 of the upper switch 22.

To give a concrete example of the use of the control device above described, I illustrate a booster motor 40 and a blower motor 41. By blower motor in this connection I mean a motor employed to deliver air already heated by any suitable burner, not herein shown, the fuel for which is controlled by the valve 5. By booster motor I mean any suitable motor for delivering air to or about the heater, as for example a motor employed to increase air pressure about the exterior of a pot type burner, in which air is admitted to the interior of the burner through a plurality of holes in the pot itself. Since the details of motors and burners do not of themselves form part of the present invention, they are not herein indicated.

42 is any suitable source of power, for example a transformer, effective to provide power for the motors 40 and 41. A second transformer 43 may be employed for providing power for the resistances 13 and 16. 44 is an outside thermostat having a fixed contact 45 and a heat responsive contact 46. 47 is an inside thermostat having a fixed contact 48 and a heat responsive contact 49.

When the parts are in the position shown in Fig. 1, it will be observed that both thermostats are in circuit breaking position. Assume that the control device is employed with an oil burner having an oil burning pilot. Under those circumstances a pilot flow of fuel is being supplied. The position of the switch 22 is such that the booster motor is operated by a circuit extending intermediate the ends of the coil of the transformer 42, from a low voltage tap on the transformer 42, by a conductor 50, to the contact 32, the contact 34, 33, back by a conductor 51 to the booster 40, and thence by the conductor 52 back to the transformer. At the same time the switch 23 is in circuit breaking position and the blower motor is not operative. Assume then that the room thermostat closes and calls for heat, the result of the closure of the room thermostat, as will be clear from the circuit, is the closure of a circuit which includes the resistance 13 and the transformer 43. Thereupon the warping bar 9 warps into the position in which it is shown in Fig. 2, and the valve stem 5 rises to the position in which it is shown in Fig. 2, and thereby tilts the switches in such fashion that, although no change of circuit is made by the switch 22, the switch 23 is moved to circuit closing position, and a circuit is closed which includes the contacts 36 and 37, the blower motor 41, and the transformer 42, for example, by means of the conductors 53 and 54.

As long as the outside thermostat 44 is in circuit breaking position, no circuit can be closed through the resistance 16, and operation is limited to an intermediate stage in which a circuit is closed through the blower motor and also through the booster motor, but the booster motor is still connected by a low voltage tap. If, however, the outside temperature drops sufficiently to close the thermostat 44, then a circuit is closed which includes the transformer 43 and the resistance 16, and the warping bar 14 then warps up and permits the valve stem to rise as high as the adjustable stop 17 will permit. This further tilts the switches 22 and 23. This further tilting does not change the circuit controlled by the switch 23 in the form illustrated, but closes a circuit by the switch 22 which includes the contact 31 instead of the contact 32. The result is to give the booster motor 40 full voltage from the transformer 42, which thereby increases the speed of the booster motor and the capacity of whatever fan is controlled thereby. In other words, in the particular form shown in the drawing, when both thermostats are in circuit breaking position and only a pilot supply of fuel is maintained, the booster motor is on at, say, half power, and the blower motor is off.

When the room thermostat closes, the circuit through the blower motor is closed, but the booster motor is still left at intermediate capacity, and finally, when the outside thermostat moves to circuit breaking position, the blower motor is still in circuit and the booster motor is stepped up to full voltage.

It will be understood that I may employ, in place of the fixed tap connection 50, a variable resistance operated in conjunction with the movement of the valve stem 5, to provide a smoother shift of voltage for the booster motor. It will also be understood that I may so arrange the switch 22 as to eliminate the operation of the booster motor at the pilot stage, and I wish the present description, drawing and circuit to be taken as illustrative or diagrammatic rather than as limiting me to the precise showing therein made. It will be understood, for example, that I may widely vary the control of the two motors in response to or in association with the movement of the valve stem.

It will be understood also that I may reverse or vary the relationship of the motors, and may step up the blower motor instead of the booster motor, or I may step up both, in response to the closure of one or both thermostats.

It will be further understood that any suitable means not herein shown may be employed for preventing operation of the blower motor when the furnace is cold, as for example when the furnace or heater has been running at pilot stage, and intermediate or maximum heat is called for, there being a lag before the furnace is heated, during which operation of the blower motor would be disadvantageous.

I claim:

1. In a control device for liquid fuel valves for use with burners and the like, a valve housing, means for delivering fuel thereto, a fuel delivery passage from said housing, a valve therefor, and means for actuating it, a blower motor effective to move air heated by the burner, and a booster motor effective to deliver air to the burner and a power source therefor, including a transformer having a low voltage tap and a high voltage tap, an actuating circuit for the booster motor, including the low voltage tap, and an alternate actuating circuit therefor, including the high voltage tap, and a circuit for the blower motor, including the high voltage tap, and switch means on said valve, including separate switches, one for each motor, and means for closing said switches in response to movement of the valve to increased flow position, one of said switches including contacts adapted to make and break a circuit for said last mentioned motor, the other having a plurality of pairs of contacts adapted successively to make and break the circuits for the first mentioned motor, whereby, in response to a predetermined movement of the valve, the circuit through the low voltage tap is closed, and in response to a different movement of the valve the circuit through the high voltage tap is closed.

2. In combination, in a control device for heaters, a booster motor effective to deliver air to a burner for supporting combustion, a blower motor effective to deliver heated air from the burner to the space to be heated, means for delivering fluid fuel to the burner, and means for controlling the flow of fuel to the burner, including a valve seat, and a valve, thermostatic control means for said valve, a blower motor circuit, and a booster motor circuit, and means for controlling said blower and booster motor circuits in response to movement of the valve, including a plurality of mercury switches located angularly in relation to each other, and means for moving said switches in unison in direct response to movement of the valve, one of said switches having a single pair of contacts in circuit with the blower motor, the other of said switches having two separate pairs of contacts in circuit with said booster motor, a high voltage tap for one of said pairs of contacts, and a low voltage tap for the other of said pairs.

STANLEY PERRY.